United States Patent [19]

Hammerberg et al.

[11] 4,456,940
[45] Jun. 26, 1984

[54] VOLTAGE CONTROLLED TRANSIENT PROTECTION UNIT

[75] Inventors: Lars E. Hammerberg, Handen; Royne G. Hjortendal, Sorunda; Walter Ghisler, Upplands Väsby, all of Sweden

[73] Assignee: Telefonaktiebolaget L M Ericsson, Stockholm, Sweden

[21] Appl. No.: 414,330

[22] PCT Filed: Dec. 23, 1981

[86] PCT No.: PCT/SE81/00392
§ 371 Date: Aug. 10, 1982
§ 102(e) Date: Aug. 10, 1982

[87] PCT Pub. No.: WO82/02287
PCT Pub. Date: Jul. 8, 1982

[30] Foreign Application Priority Data

Dec. 23, 1980 [SE] Sweden ............................. 8009142

[51] Int. Cl.³ ............................................. H02H 9/04
[52] U.S. Cl. ......................................... 361/56; 361/119
[58] Field of Search ................... 361/56, 91, 110, 111, 361/119

[56] References Cited

U.S. PATENT DOCUMENTS 3,126,452 3/1964 Pettersson ...................... 361/119 X
3,558,830 1/1971 Bender ............................. 361/56 X

FOREIGN PATENT DOCUMENTS 2363313 7/1974 Fed. Rep. of Germany ........ 361/56
2541942 3/1977 Fed. Rep. of Germany ........ 361/56
55-117398 9/1980 Japan ................................... 361/119

Primary Examiner—Harry E. Moose, Jr.
Attorney, Agent, or Firm—Roberts, Spiecens & Cohen

[57] ABSTRACT

An arrangement for protection of circuits in a telephone exchange against overvoltages like for example lightning transients or so called longitudinal disturbances appearing on the lines connected to the exchange. The arrangement having at least two non-linear electronic circuit elements (T2, T3) which selectively shunt the overvoltages to ground, the junction between the conduction states, conducting-non-conducting, for at least one of the circuit elements being controllable.

4 Claims, 5 Drawing Figures

VOLTAGE CONTROLLED TRANSIENT PROTECTION UNIT

BACKGROUND OF THE INVENTION

The present invention relates to an arrangement for overvoltage protection of circuits in a telephone exchange. Such overvoltages, for example, can be lightning transients on lines connected to the exchange or so called longitudinal disturbances on subscriber lines caused by short circuit to earth.

BACKGROUND ART

In the journal Electronics of Oct. 25, 1979, page 42 an arrangement for the protection of circuits connected to a telephone network is described. The arrangement is intended to protect against, for example, lightning transients on subscriber lines and consists mainly of four so called clamp diodes, which connect the two wires of the subscriber line to the two poles of the power supply source. By this arrangement the maximum voltage between the a-wires and the b-wires is limited to the pole voltage of the supply source. The disadvantage with this design of the protection circuit is that the heavy transient currents which can be conducted to the negative pole of the supply source give rise to a voltage-drop in the power supply among other things due to its inherent resistance. Such voltage-drops can destroy other equipment in its turn.

To handle this disadvantage it has been suggested, compare for example the Swedish patent specification No. 7714316-2, to conduct the negative transient currents to earth by means of Zener diodes instead of towards the negative pole of the battery. The disadvantage with this solution is that the transient protection is not active to voltages in the voltage gap between the varying battery voltage and the Zener voltage.

A further problem with known arrangements resides in the cooperation of the protection unit with the ringing relay of the subscriber line. Most often connection of the ringing signal to the line is made by means of a relay. The ringing signal generator generates an alternating voltage for example in the interval from $-200$ V t$+150$ V while the working interval for the line circuit connected to the line is between 0 V and the battery voltage, for example $-56$ V. The transient protection for the line circuit, thus intended to protect against voltages lower than $-56$ V and higher than 0 V, must be located between the ringing relay and the line circuit so that the protection circuit does not short circuit the ringing voltage. The disadvantage with such an arrangement is that the sometimes heavy transient currents during, for example, lightning disturbances, pass through the relay contact, which consequently must to be dimensioned for this load.

BRIEF SUMMARY OF THE INVENTION

The technical problem to be solved and an object of by the present invention resides in the simultaneous elimination with one arrangement of the above mentioned disadvantages according to prior art.

Briefly, the invention contemplates apparatus for the protection of circuits in a telecommunication equipment against overvoltages appearing on lines connected to the circuits having at least two non-linear electronic circuit elements, which selectively shunt said overvoltages to ground, wherein the conduction state for at least one of the non-linear electronic circuit elements is controllable.

The advantages with the solution according to the invention are obvious as the protection circuit is effective for all realistic values of the disturbance voltage at the same time as the ringing relay only need be dimensioned with reference to its actual function as connecting element for ringing voltage to the subscriber.

BRIEF DESCRIPTION OF DRAWING

The invention will be described below with reference to the accompanying drawing is which

DETAILED DESCRIPTION OF THE PREFERRED EMBODIMENT

Figure 1:
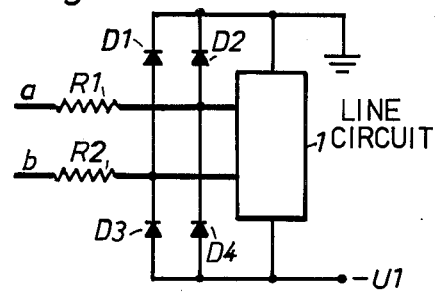
FIG. 1 illustrates an arrangement according to prior art.

FIG. 1, according to the above, illustrates an arrangement according to prior art. The two wires a, b of a subscriber line are connected to a so called Subscriber Line Interface Circuit or line circuit 1. To protect the circuit 1 against positive transients coming on the wire, a current limiting resistor R1 has been connected in series with the line and a diode D2 has been connected to earth or ground. By means of this arrangement the voltage at the connection of the wire a to the circuit 1 can maximally be equal to zero. A similar arrangement protects the circuit 1 against positive transient coming on the wire b. Negative transients are short circuited to the negative pole of the supply voltage source having the voltage $-U1$. A protection circuit designed in this way has the above mentioned disadvantages.

Figure 2:
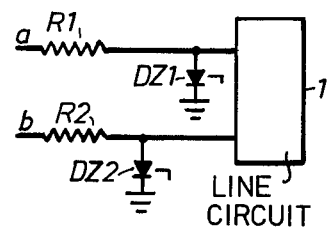
FIG. 2 illustrates an arrangement according to prior art.

FIG. 2 illustrates another protection circuit according to prior art. Two Zener diodes DZ1 and DZ2 connect the transient currents, positive and negative, through two current limiting resistors R1 and R2 to earth.

Figure 3:
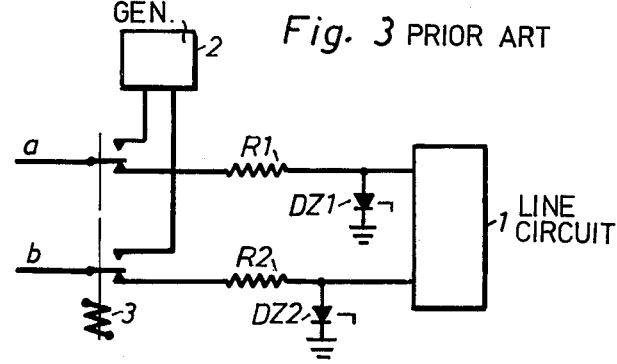
FIG. 3 illustrates an arrangement according to prior art.

In FIG. 3 the arrangement according to FIG. 2 is shown together with a conventionally connected ringing signal generator 2. A ringing relay 3, controlled from the exchange, can, for signalling to the subscriber, connect the a-wire and b-wire of the subscriber line to the two poles of the generator.

Figure 4:
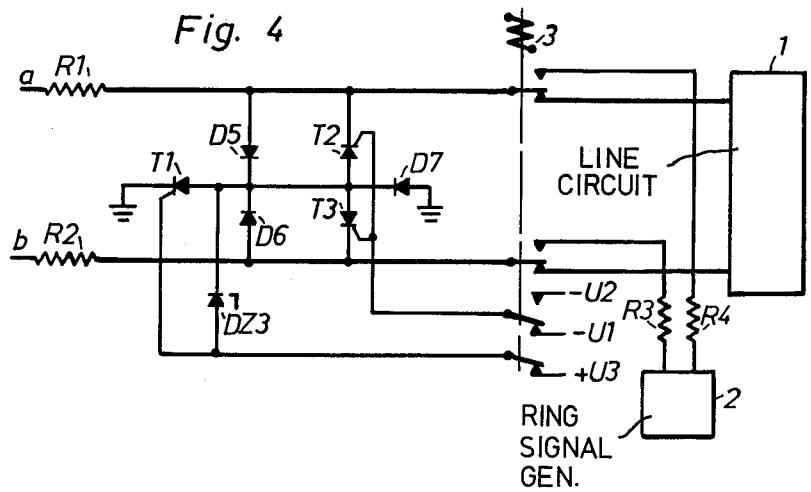
FIG. 4 illustrates an arrangement according to the invention.

In FIG. 4 a circuit diagram for an arrangement according to the invention is illustrated. Positive as well as negative transient currents on both speech wires are, as will be shown, connected to earth. In this way the problem with a voltage-drop in the power supply to the line circuits 1 is avoided. The problem with the solution according to FIG. 2 is avoided by making the ignition voltage for the units, which protect against negative transients, follow the supply voltage of the line circuit 1. Finally the contacts of the ringing relay 3 are protected against the transient currents by placing the relay between the protection circuit and the line circuit 1.

The arrangement is illustrated for the unactivated state in FIG. 4. A positive transient on the wire a is conducted to earth through the diode D5 and the thyristor T1 whose gate junction is kept forward biased by means of a voltage $+U3$ relative earth. In a similar manner a positive transient on the wire b is conducted through the diode D6 and the thyristor T1 to earth. In the same way as described above two current limiting resistors R1 and R2 are connected between the protection device and the a-wires and b-wires.

A negative transient, of a magnitude greater than the supply voltage U1, on the wire a is conducted to earth through the thyristor T2 and the diode D7. The gate of the thyristor is kept at a voltage −U1 equal to the supply voltage. The thyristor T3 and the diode D7 conduct the negative transients on the wire b. The circuit 1 is thus when in the unactivated state, protected against positive transients coming from the line and negative transients having a magnitude greater than the supply voltage U1.

A lightning disturbance, however, can occur at the same time as ringing signal is sent to the subscriber. The ringing relay 3 has in this case been activated and connected the poles of the ringing signal generator through two current limiting resistors R3 and R4 to the line. With the dashed-dotted line in the figure it has functionally been indicated that at the same time as the ringing relay is activated a second voltage −U2 is fed to the control electrodes of the thyristors T2 and T3 and the voltage +U3 to the control electrode of the thyristor T1 is disconnected. The Figure, however, is not to be understood in such a way to limit the connection and disconnection of these latter voltages have to be done by means of relay contacts on the relay 3.

The connected ringing voltage, being for example ±200 V must of course not be shunted to earth by the protection device. On the contrary, voltages higher than +200 V and lower than −200 V shall activate the protection circuit. This is achieved in the following way. A Zener diode DZ3 with the Zener voltage 200 V is connected between the anode and the gate of the thyristor T1. Positive transients on the a-wire and the b-wire respectively of a magnitude greater than 200 V are then shunted through the diode D5 and D6 respectively and the thyristor T1 to earth. The gates of the thyristors T2 and T3 are, as above mentioned, connected to the voltage −U2, suitably equal to −200 V. By this arrangement negative transients of a magnitude greater than 200 V, will be shunted by the thyristors T2 and T3 and the diode D7 to earth.

Figure 5:
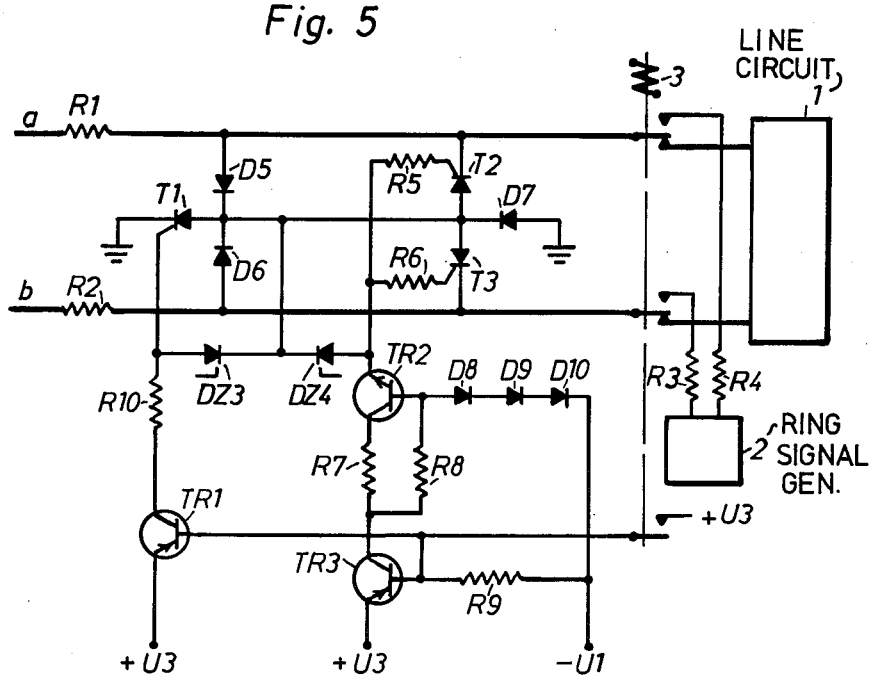
FIG. 5 illustrates more in detail an arrangement according to the invention.

In FIG. 5 an embodiment of the arrangement according to the invention is illustrated somewhat more in detail. The protection circuit is designed essentially as described above. The two transistors TR1 and TR3 have constant emitter voltage +U3 for example equal to +5 V. In the unactivated state base current is drawn from the transistors to the supply voltage −U1, for example −48 V, through a resistor R9. The transistor TR1 is conducting and delivers control current to the thyristor T1 according to the above. Also the transistor TR3 is conducting and the collector current passes through the resistor R8 and the chain of diodes D8, D9, D10 to the supply voltage source −U1. A voltage lower than −U1 on, for example, the wire a then switches on the thyristor T2, which takes control current through the resistor R5 and the transistor TR2.

When a ringing voltage is fed to the subscriber the line circuit 1 is disconnected in the same way as earlier described at the same time as a third contact on the ringing relay connects the voltage +U3 to the base of the transistors TR1 and TR3, which consequently are cut off. The ringing voltage, for example, ±200 V is supplied onto the line without being influenced by the protection circuit. Positive transients on the a-wires and the b-wires greater than 200 V are shunted to earth in a way as described above. Negative transients on the a-wire, for example, of a magnitude greater than 200 V opens a current path from earth through the diode D7, the Zener diode DZ4, with the Zener voltage 200 V, the resistor R5 and the gate-cathode junction of the thyristor T2. Then the thyristor T2 switches on and shunts the trasient through the diode D7 to earth. A similar function applies to negative transients on the b-wire.

What we claim is:

1. Arrangement for protection of a circuit with a supply voltage in a telecommunication equipment against overvoltages appearing on a line connected to the circuit between a terminal and the circuit, on which line in a first operation mode signals representing information are transmitted to and from the circuit and in a second operation mode signalling in the form of alternating voltage is transmitted to the terminal, said arrangement comprising a first and a second current path means connected between the line and a ground terminal, each of said current path means comprising at least one non-linear electronic circuit element, at least one of said non-linear electronic circuit element being controllable, said first current path means being arranged to operate in said first operating mode to short circuit to ground positive overvoltages and said second current path means being arranged to short circuit to ground negative over-voltages, of a magnitude exceeding the magnitude of the supply voltage to said circuit, and whereby in said second operation mode said first current path means is arranged to short circuit to ground positive overvoltages exceeding the positive peak value of said alternating voltage, and said second current path means is arranged to short circuit to earth negative overvoltages, of a magnitude exceeding the magnitude of the negative peak value of said alternating voltage.

2. Arrangement according to claim 1 wherein said first current path means comprises a diode in series with a thyristor, the gate and anode of which are connected by means of a Zener diode, having a Zener voltage equal to the positive peak value of said alternating voltage and the gate of which, during said first operation mode, is arranged to receive such voltage that the thyristor will become conducting for a positive voltage on its anode.

3. Arrangement according to claim 1 or 2 wherein said second current path means comprises a diode in series with a thyristor whose gate during the first operation mode is arranged to receive such a voltage that the thyristor will conduct for a negative voltage on its cathode of a magnitude exceeding the magnitude of the supply voltage to the said circuit, and whose gate during the second operation mode is arranged to receive such a voltage that the thyristor will become conducting for a negative voltage on its cathode of a magnitude exceeding the magnitude for the negative peak value of said alternating voltage.

4. Arrangement according to claim 1 or 2, wherein said second current path means comprises a diode in series with a thyristor whose gate and anode are connected by means of a Zener diode, having a Zener voltage equal to the magnitude of the negative peak value of said alternating voltage.

* * * * *